J. W. REIFSNIDER.
VEHICLE SPRING LUBRICATOR.
APPLICATION FILED JUNE 28, 1915.
1,185,940.
Patented June 6, 1916.
2 SHEETS—SHEET 2.
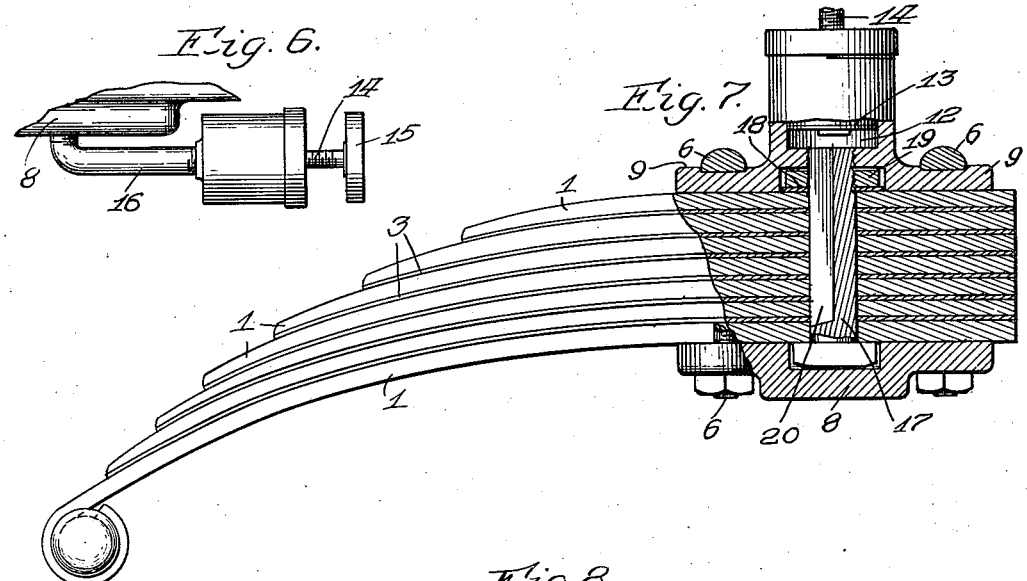
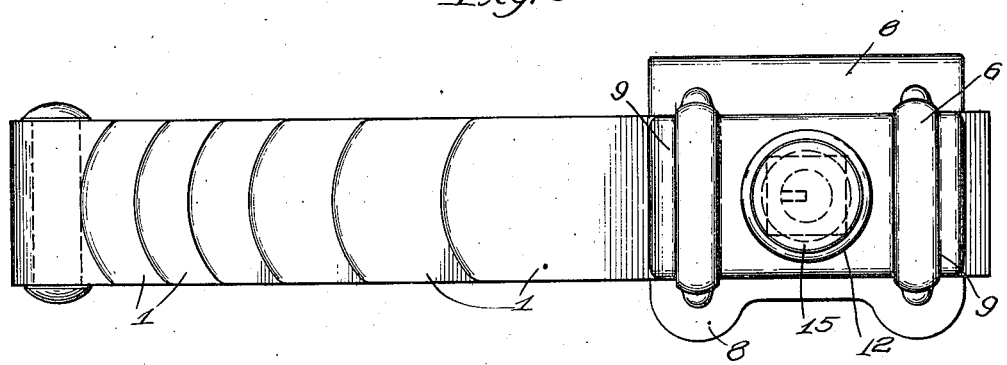
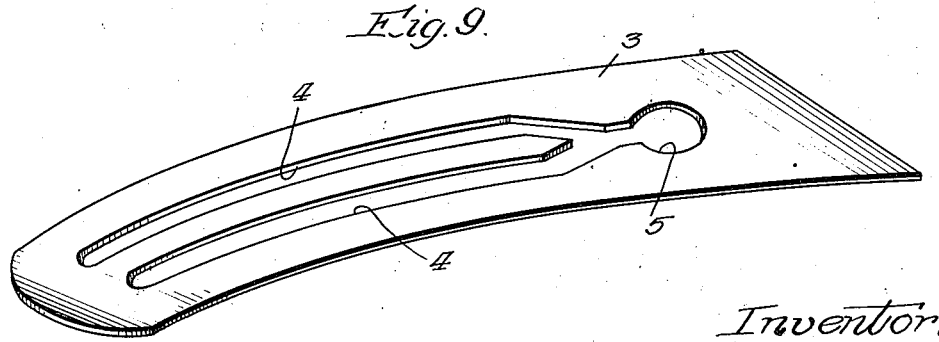
Witness:
Inventor:
John W. Reifsnider
By Albert Scheith, Atty.

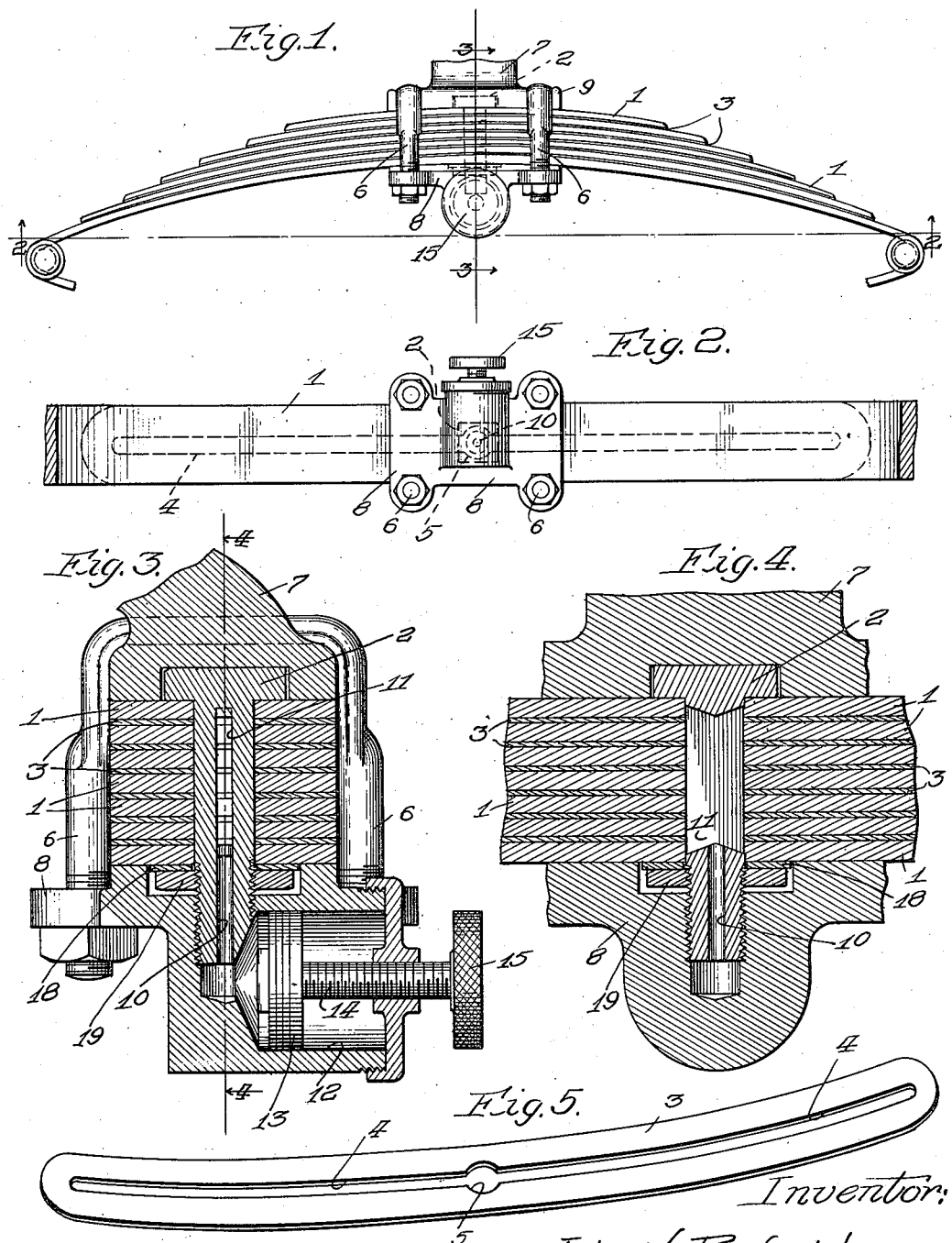

UNITED STATES PATENT OFFICE.

JOHN W. REIFSNIDER, OF CHICAGO, ILLINOIS.

VEHICLE-SPRING LUBRICATOR.

1,185,940.

Specification of Letters Patent.　Patented June 6, 1916.

Application filed June 28, 1915.　Serial No. 36,643.

*To all whom it may concern:*

Be it known that I, JOHN W. REIFSNIDER, citizen of the United States, residing at Chicago, in the county of Cook and State of Illinois, have invented certain new and useful Improvements in Vehicle-Spring Lubricators; and I do hereby declare the following to be a full, clear, and exact description of the invention, such as will enable others skilled in the art to which it appertains to make and use the same.

My invention relates to laminated springs, its general objects being to afford a smoother action, to reduce the wear on the leaves or laminæ constituting the springs, and to make the springs noiseless in action. In springs of this kind, as commonly used for supporting vehicle bodies upon the running gear, the action of the springs when in service causes their constituent leaves to slide more or less with respect to the leaves adjacent thereto. This sliding introduces a friction which causes undue wear upon the leaves, retards the free action of the spring as a whole, and causes objectionable creaky or squeaky noises. Attempts to overcome these objections by introducing a lubricant between each successive pair of leaves have been unsuccessful, partly because the pressure of the leaves against each other soon squeezes out any lubricant interposed between them, partly because the sliding of the leaves upon one another hastens this expelling of any interposed lubricant, and also because it has not been found feasible to replenish the supply of lubricant without either forcibly separating the constituent leaves or disassembling the spring.

My invention, in its general aspects, aims to avoid these shortcomings by providing means for supplying lubricant between each pair of adjacent spring leaves without permitting said lubricant quickly to be squeezed or pushed out: also, by providing simple and effective means for replenishing the supply of lubricant.

More particularly, the objects of my invention are to provide each successive pair of spring leaves with at least one interposed duct or channel terminating short of the edges of the leaves: to provide a supply of lubricant connected to all of said ducts: to provide a lubricant-supply passage within the clamping element which holds the various spring leaves in operative position: to provide lubricant container (such as a grease cup) mounted on and preferably partly integral with such a clamping element: to provide external operable means for forcing lubricant from such a source of supply into the several ducts, and to effect such a feeding of lubricant also by the vacuum action due to the consumption of the lubricant in the ducts when the spring is in service.

Further objects will appear from the following specification and from the accompanying drawings, in which—

Figure 1 is a fragmentary elevation of an elliptical spring equipped with my invention. Fig. 2 is an upward horizontal section through Fig. 1 along the line 2—2. Fig. 3 is an enlarged vertical section through Fig. 1 along the line 3—3. Fig. 4 is a vertical section through Fig. 3 along the line 4—4. Fig. 5 is an enlarged perspective view of one of the elements interposed between the spring leaves in Figs. 1, 3 and 4. Fig. 6 is a fragmentary side elevation showing another arrangement of the grease cup. Fig. 7 is a fragmentary elevation of a half-spring equipped with another embodiment of my invention. Fig. 8 is an upward horizontal view of the embodiment of Fig. 7. Fig. 9 is an enlarged perspective view of one of the interleaved elements shown in Fig. 7.

While my invention may be carried out with substantially equal facility in a number of different embodiments, and may be applied to various types of springs, it is particularly adapted to springs of elliptical, semi-elliptical and quadri-elliptical types, and is shown in the drawings as applied to all three of these forms. Thus, Figs. 1 and 2 show an elliptical spring comprising steel leaves 1 kept from sliding bodily with respect to each other by a bolt 2 extending through alined central perforations in all of the said leaves. The bolt 2 also extends through similarly alined perforations in intermediary elements 3, one of which is interposed between each successive pair of the leaves 1. Each spacer element 3 is preferably made of brass, bronze or other material softer than the leaves, and each such element has at least one longitudinal slot 4 leading from the central perforation 5 but stopping short of the end of the element.

Spanning all of the spring leaves 1 and slotted elements 3 near their middle are U-bolts 6, connecting the hanger 7 with a strap 8, said hanger preferably having at its ends lugs 9 for preventing the U-bolts 6 from slipping off the same. The U-bolts, 6, together with the hanger 7 and strap 8 and the bolt 2 combine to form a clamping element which continually maintains both the spring leaves 1 and the interposed slotted elements 3 in operative relation, while permitting the free end portions of said leaves and elements to slide back and forth upon each other when the spring is compressed or distended. Extending through the bolt 2 from its tip almost to the head thereof is a passage which, in the embodiment of Figs. 3 and 4, consists of a bore 10 leading to a transverse slot 11, the latter being so disposed when the parts are assembled as to face the ends of the slots 4 in all the spacer elements 3. The vertical bore 10 of the bolt 2 leads to a horizontal bore 12 in the strap 8, which bore has a plunger 13 slidably mounted therein and adapted to be moved by a screw 14 fast upon said plunger and threaded to a head 15 secured to the strap 8. Upon removing this head, together with the screw and plunger, the bore 12 (which forms a lubricant container) may be filled with a thick oil, a grease or other lubricant. Then, upon replacing the plunger, the latter may be moved to force the lubricant through the bore 10 and transverse passage 11 into the slots 4 in all of the spacer elements, thus providing lubricant between the opposed faces of every consecutive pair of the laminæ or spring leaves. However, since the slots 4 do not extend to the edges of the elements 3, the lubricant will not be forced out, but will only be gradually worked out of the slots by the sliding and rubbing of the spring leaves upon the lubricant-carrying spacer elements. When the spring is in action (as for example, on a vehicle traveling over rough roads) the sliding of the spring leaves on the spacer elements will shove the lubricant out of the end portions of the slots 4, thus tending to create a vacuum in these slots, whereupon the air pressure on the lubricant will force this into the slots toward the said ends of the latter. Consequently, the grease or other lubricant will be continuously fed toward the outer ends of the constituent laminæ (where the sliding action is greatest), besides being partially distributed between the leaves at points nearer the middle of the latter. In practice, I prefer to adjust the plunger 13 so as to have it continually exert a pressure on the lubricant, thereby aiding the above described vacuum action in feeding the lubricant.

Instead of building the grease cup integral with the hanger strap or clamping member, this cup may be connected to the central supply passage by a pipe 16, as in Fig. 6, thereby permitting a standard type of grease cup to be used. Or, the grease cup may be mounted vertically, as in Fig. 7, in which case the bolt 17 may have a single lateral channel 20 extending direct to the grease cup. In either case, I preferably interpose an oil-tight and air-tight washer 18 between the nut 19 of the central bolt and the adjacent surface, so as to prevent a leakage of lubricant at this point and also to facilitate the vacuum action.

While I have shown and described my invention in several embodiments, I do not wish to be limited to the details of construction or arrangement here disclosed, it being evident that the same might be varied in many ways without departing from the spirit of my invention. For example, instead of a single slot 4, each spacer element 3 may have a plurality of such slots as shown in Fig. 9. In each case, it will be evident that the edges of these slots will coöperate with the opposed faces of the adjacent spring leaves from walls bordering ducts between the said spring leaves, through which ducts lubricant may be continuously and forcibly supplied from a source located outside the laminæ comprising the active portion of the spring.

I claim as my invention:

1. The combination with a laminated spring, spacer elements interposed between the consecutive laminæ, said springs and spacer elements having registering apertures forming a passage from the exterior of the spring, the spacer element having closed end slots extending from said passage, of means for forcing lubricant from outside of said spring through said passage and into said slots.

2. A laminated spring including relatively superposed laminæ and spacer elements disposed between the consecutive laminæ, there being alined perforations in said laminæ and spacer elements, each of said spacer elements having a slot leading from said perforation and extending longitudinally of the spring but terminating short of the end of the adjacent laminæ, and a lubricant container connected by said perforations to the slots in all of said spacer elements.

3. A laminated spring including relatively superposed laminæ and spacer elements disposed between the consecutive laminæ, there being alined perforations in said laminæ and spacer elements, each of said spacer elements having a slot leading from said perforation and extending longitudinally of the spring but terminating short of the end of the adjacent laminæ, clamping means for maintaining said laminæ and spacer elements in operative relation, and a lubricant container carried by said clamping means and connected by said perforations to the slots in all of said spacer elements.

4. The combination with a spring including relatively superposed leaves and elements interposed between each successive pair of leaves, of a supply of lubricant, each of said elements having at least one slot terminating short of the edges of the leaves adjacent to said element, there being a passage extending through all of said leaves and elements for connecting the supply of lubricant with all of said slots.

5. The combination with a spring including a pair of superposed leaves, of an auxiliary leaf disposed therebetween, said auxiliary leaf being equipped with a longitudinal slot, the lateral walls of said slot and the opposed faces of the leaves constituting the borders of a duct through which lubricant may be supplied to the said faces of the leaves.

6. The combination with a laminated spring, of spacer elements interposed between the consecutive laminæ, all of said laminæ and spacer elements having alined and substantially central perforations, each of said elements having slots extending from its central perforation in opposite directions, a fastening element extending through all of said perforations and equipped with a passage connecting all of said oppositely directed slots and extending beyond the laminæ, and a supply of lubricant connected to said passage.

7. Spring construction including a plurality of leaves having alined perforations, a laterally recessed bolt extending through said perforations, an auxiliary leaf member having a perforation housing a portion of said bolt, there being a plurality of parallel channels formed in said auxiliary member longitudinally thereof and jointly connected to said perforation at one side thereof for permitting lubricant to enter said channels from the recess in said bolt, the wall of the perforation in said auxiliary member being unbroken at the side opposite the connection so as to prevent the passage of lubricant in a direction opposite to said channels.

8. The combination with a laminated spring, of spacer elements interposed between the consecutive laminæ, all of said laminæ and spacer elements having alined perforations disposed near one end of said laminæ and elements, each of said elements having slots extending from its said perforation longitudinally of said element, a fastening member extending through all of said perforations and provided at one side with a longitudinal groove facing the said slots and extending beyond the laminæ, and a means for supplying lubricant to said groove, the bottom of said groove and the walls of the said perforations co-acting to prevent the feeding of lubricant from the said groove in directions other than into the said slots.

JOHN W. REIFSNIDER.